United States Patent [19]
Engle et al.

[11] 3,858,655
[45] Jan. 7, 1975

[54] TREATING A SUBTERRANEAN HYDROCARBON-CONTAINING FORMATION

[75] Inventors: Charles J. Engle; Paul R. Prentice, both of Bartlesville, Okla.

[73] Assignee: Phillips Petroleum Company, Bartlesville, Okla.

[22] Filed: Aug. 7, 1973

[21] Appl. No.: 386,352

[52] U.S. Cl. .............................. 166/305 R, 166/307
[51] Int. Cl. ............................................. E21b 43/25
[58] Field of Search........ 166/305 R, 273, 294, 295, 166/307, 300, 270

[56] References Cited
UNITED STATES PATENTS

| | | | |
|---|---|---|---|
| 3,062,283 | 11/1962 | Trantham | 166/260 |
| 3,203,480 | 8/1965 | Froning | 166/252 |
| 3,258,072 | 6/1966 | Froning | 166/252 |
| 3,308,885 | 3/1967 | Sandiford | 166/295 |
| 3,387,655 | 6/1968 | Hurd | 166/270 |
| 3,392,782 | 7/1968 | Ferrell et al. | 166/270 X |
| 3,435,899 | 4/1969 | McLaughlin et al. | 166/292 |
| 3,529,666 | 9/1970 | Crowe | 166/300 |
| 3,599,715 | 8/1971 | Roszelle | 166/273 |
| 3,757,861 | 9/1973 | Routson | 166/273 |

*Primary Examiner*—Stephen J. Novosad

[57] ABSTRACT

A method for treating a preselected portion of a subterranean hydrocarbon formation penetrated by at least one well bore to free the formation of oxygen and provide a water-wet matrix.

20 Claims, No Drawings

TREATING A SUBTERRANEAN HYDROCARBON-CONTAINING FORMATION

It is desirable to provide a method for cleaning hydrocarbons from preselected portions of a formation and free the formation portion of oxygen. This formation cleaning can be for preparing the formation for subsequent treatment or any other purpose for which it would be desirable to have a water-wet matrix free of oxygen.

This invention therefore resides in a method for treating a preselected portion of a subterranean hydrocarbon containing formation penetrated by at least one well bore to free the formation portion of oxygen, provide a water-wet matrix by passing a hydrocarbon solvent through the well bore and into the formation, thereafter passing an oxidizing agent through the well bore and into said formation, and thereafter passing a reducing agent through the well bore and into said formation.

Other aspects, objects, and advantages of the present invention will become apparent from a study of the disclosure and the appended claims.

In the method of this invention, a hydrocarbon solvent is passed through a well bore and into the formation. Thereafter, an oxidizing agent is passed through the well bore and into the formation, and thereafter a reducing agent is passed through the well bore and into the formation. An aqueous polymer solution can thereafter be passed through the well bore and into the formation for plugging portions of the formation, for example, to alter the flow paths of fluid passing through the formation. Each of the solvent, oxidizing agent, and reducing agent, and aqueous polymer solution where utilized, are passed by conventional means to a location in the formation at which at least portions of said solvent, oxidizing agent, reducing agent, and polymer are spaced from the well bore a distance of at least 2 feet, preferably a distance in the range of 2 feet to 50 feet.

The preselected portion of the formation desired to be treated by the method of this invention is thereby washed with solvent to remove in-place hydrocarbons, thereafter washed with an oxidizing agent to make the formation water-wet, and thereafter washed with a reducing agent to remove oxygen from said preselected formation portion. An aqueous polymer solution can thereafter be injected into the preselected formation portion for altering the permeability and porosity of the formation portion.

It has been discovered that a formation can be effectively cleaned with the method of this invention and subsequent polymer treatments in the cleaned formation will be effective for extended periods of time relative to heretofore utilized methods.

The volume and concentration of cleaning components injected, the contact time, reaction time, and other variable factors are dependent upon the type and preselected portion of the formation to be treated. An example, illustrative treatment by the method of this invention is as follows:

Solvent . . . One of toluene, pentane, benzene, light aromatic gasoline, or mixtures thereof.
Volume . . . At least greater than 0.5 pore volume of the preselected formation portion, more preferably 0.5–10 pore volumes of the preselected formation portion.
Oxidizing Agent . . . One of hydrogen peroxide, sodium peroxide, or solutions of potassium permanganate, sodium permanganate, ammonium chromate, ammonium dichromate, the alkali metal chromates, the alkali metal dichromates, and chromium trioxide. Hydrogen peroxide and sodium peroxide because of their low cost and ready availability are presently the preferred oxidizing agents for use in the practice of this invention.
Volume . . . At least greater than 0.5 pore volume of the preselected formation portion, more preferably 0.5–6 pore volumes of the preselected formation portion.
Concentration . . . 0.5–30 weight percent oxidizing agent.
Reducing Agent . . . One of formaldehyde, sodium sulfide, sodium hydrosulfite, sodium metabisulfite, potassium sulfite, sodium bisulfide, potassium metabisulfite, sodium sulfite, sodium thiosulfate, ferrous sulfate, thioacetamide; and other nonsulfur-containing compounds as hydroquinone, ferrous chloride, para-hydrazinobenzoic acid, hydrazine phosphite, or hydrazine dichloride.
Volume . . . At least greater than 0.5 of the pore volume of the preselected formation portion, more preferably 0.5–6 pore volumes of the preselected formation portion.
Concentration of Reducing Agent in Aqueous Carrier . . . In the range of about 0.5 to about 10 weight percent.
Aqueous Polymer Solution . . . Polyacrylamide in fresh water or brine in the broad range of 25 to 50,000 ppm may be used to carry out this invention. The preferred range for the polymer is 2500 to 10,000 ppm. Other polymers such as polysaccharide or a cellulose ether may be used in this invention.
Volume . . . At least greater than 0.5 pore volume of the preselected formation portion, more preferably 0.5 to 10 pore volumes of the preselected formation portion.
Concentration . . . 25 to 50,000 ppm polymer in fresh water with the percent of amide groups hydrolyzed to carboxyl groups being greater than 15 percent.

To further insure cleaning of the formation, it is preferred that the well be closed in for a period in the range of 1 to 48 hours after injection of the solvent. The oxidizing treatment can also be repeated a plurality of times with the well closed in for a period in the range of 1 day to 10 weeks after each oxidizing agent injection.

In tests on the method of this invention, X-ray fluorescent analysis of peroxide core washings, after the oxidizing step, disclosed that not only had the in-place organic fractions been removed from the core, but appreciable amounts of components containing a number of inorganic elements had been removed. It was further discovered that after a sand treated with the oxidizing agent of this invention is washed with reducing agent, the wash contains appreciable amounts of colloidal material. The reducing agent is therefore effective in dislodging and disbursing finely divided material particles from the matrix.

Other tests were conducted on sidewall cores of a Venezuelan hydrocarbon-containing formation treated with an aqueous polymer treatment without prior cleaning and cores cleaned by the method of this invention and thereafter treated with the polymer solution. The amount of polymer absorbed in pounds per acre foot was measured on each core set by Hach Laboratory Turbidimeter of Hach Chemical Company, Box 907, Ames, Iowa. Results of these tests were as follows:

TABLE I

| Core Depth | Prior Treatment by Invention | Turbidity Test Adsorption in Lbs/acre-foot |
| --- | --- | --- |
| 3,350 ft., Well A | No | 187 |
|  | Yes | 403 |
| 3,290 ft., Well A | No | 19 |
|  | Yes | 72 |
| 3,292 ft., Well A | No | 76 |
|  | Yes | 164 |

Table I therefore shows that cleaning of the cores by the method of this invention was effective and conditioned said cores for receiving a high volume of polymer, thereby increasing the plugging effects of a polymer treatment.

The following is an example illustrative field application of this invention.

Inject 333 barrels of toluene into the pore formation and thereafter shut in for 24 hours. Thereafter inject three separate batches of 333 barrels each of 3 percent hydrogen peroxide solution in fresh water and close the well in for seven days after each injection. Thereafter inject 1000 barrels of aqueous formaldehyde solution over a period of 12 hours. Thereafter inject 333 barrels of 2,500 ppm aqueous polymer solution with said polymer being partially hydrolyzed polyacrylamide having a degree of hydrolysis of 30 percent.

Gelled polymer solutions of polyacrylamides formed by the addition of sodium dichromate and sodium hydrosulfite reagents may also produce beneficial effects on the properties of the sand and may persist for long periods of time. Such treatment may last for periods of from a few weeks to a year or more.

Other modifications and alterations of this invention will become apparent to those skilled in the art from the foregoing discussion and examples and it should be understood that this invention is not to be unduly limited thereto.

What is claimed is:

1. A method for cleaning a porous subterranean hydrocarbon-containing formation penetrated by at least one well bore, which method comprises, in combination, the steps of:
   a. passing through said well bore and into said formation a hydrocarbon solvent capable of washing at least a portion of said contained in-place hydrocarbon from a preselected portion of said formation desired to be treated;
   b. thereafter passing through said well bore and into said portion of said formation an oxidizing agent capable of increasing the water wettability of said portion of said formation; and
   c. thereafter passing through said well bore and into said portion of said formation a reducing agent capable of reacting with sand removing residual oxidizing agent and/or oxygen from said portion of said formation.

2. A method according to claim 1 wherein said solvent, said oxidizing agent, and said reducing agent are each passed to a location in said formation such that said preselected portion of the formation comprises a distance of at least 2 feet from said well bore.

3. A method according to claim 2 wherein said distance is within the range of from 2 to 50 feet.

4. A method according to claim 2 wherein the volume of said solvent, the volume of said oxidizing agent, and the volume of said reducing agent are each greater than about 0.5 of the pore volume of said preselected portion of said formation desired to be treated.

5. A method according to claim 4 wherein:
   the volume of said solvent is within the range of from 0.5 to about 10 pore volume of said preselected portion of said formation desired to be treated; and
   the volume of said oxidizing agent and the volume of said reducing agent are each within the range of from 0.5 to about 6 pore volume of said portion of said formation desired to be treated.

6. A method according to claim 4 wherein:
   said oxidizing agent is selected from the group consisting of hydrogen peroxide, sodium peroxide, potassium permanganate, sodium permanganate, ammonium chromate, ammonium dichromate, the alkali metal chromates, the alkali metal dichromates, and chromium trioxide; and
   said reducing agent is selected from the group consisting of formaldehyde, sodium sulfide, sodium hydrosulfite, sodium metabisulfite, potassium sulfite, sodium bisulfide, potassium metabisulfite, sodium sulfite, sodium thiosulfate, ferrous sulfate, thioacetamide, hydroquinone, ferrous chloride, parahydrazinobenzoic acid, hydrazine phosphite, and hydrazine dichloride.

7. A method according to claim 6 wherein said solvent is selected from the group consisting of toluene, pentane, benzene, and light aromatic gasoline.

8. A method according to claim 6 wherein:
   said oxidizing agent is an aqueous solution of hydrogen peroxide having a hydrogen peroxide concentration within the range of from 0.5 to about 30 weight percent; and
   said reducing agent is an aqueous solution of formaldehyde having a formaldehyde concentration within the range of from 0.5 to about 10 weight percent.

9. A method according to claim 1 comprising, in further combination, the step of:
   (d) after said step (c), passing through said well bore and into said formation an aqueous polymer solution.

10. A method according to claim 9 wherein:
    said polymer is a partially hydrolyzed polyacrylamide and the concentration thereof in said solution is within the range of from 25 to about 50,000 ppm; and
    the volume of said polymer solution passed into said formation is greater than 0.5 pore volume of said portion of said formation desired to be treated.

11. A method according to claim 10 wherein:
    said oxidizing agent is an aqueous solution of hydrogen peroxide having a hydrogen peroxide concentration within the range of from 0.5 to about 30 weight percent; and
    said reducing agent is an aqueous solution of formaldehyde having a formaldehyde concentration within the range of from 0.5 to about 10 weight percent.

12. A method according to claim 1 wherein:
said well bore is closed in for a period of time within the range of from 1 to 48 hours after step (a) and prior to said step (b).

13. A method according to claim 12 wherein said step (b) is repeated a plurality of times prior to said step (c), and said well bore is closed in for a period of time within the range of from about 1 day to about 10 weeks after each injection of oxidizing agent.

14. A method for treating a porous subterranean hydrocarboncontaining formation penetrated by at least one well bore, which method comprises, in combination, the steps of:
   a. passing through said well bore and into a preselected portion of said formation desired to be treated a hydrocarbon solvent;
   b. thereafter passing through said well bore and into said portion of said formation an oxidizing agent selected from the group consisting of hydrogen peroxide, sodium peroxide, potassium permanganate, ammonium chromate, ammonium dichromate, the alkali metal chromates, the alkali metal dichromates, and chromium trioxide; and
   c. thereafter passing through said well bore and into said portion of said formation a reducing agent selected from the group consisting of formaldehyde, sodium sulfide, sodium hydrosulfite, sodium metabisulfite, potassium sulfite, sodium bisulfide, potassium metabisulfite, sodium sulfite, sodium thiosulfate, ferrous sulfate, thioacetamide, hydroquinone, ferrous chloride, para-hydrazinobenzoic acid, hydrazine phosphite, and hydrazine dichloride.

15. A method according to claim 14 wherein said solvent, said oxidizing agent, and said reducing agent are each passed to a location in said formation such that said preselected portion of the formation comprises a distance of at least 2 feet from said well bore.

16. A method according to claim 15 wherein the volume of said solvent, the volume of said oxidizing agent, and the volume of said reducing agent are each greater than about 0.5 of the pore volume of said preselected portion of said formation desired to be treated.

17. A method according to claim 16 wherein:
said oxidizing agent is an aqueous solution of hydrogen peroxide having a hydrogen peroxide concentration within the range of from 0.5 to about 30 weight percent; and
said reducing agent is an aqueous solution of formaldehyde having a formaldehyde concentration within the range of from 0.5 to about 10 weight percent.

18. A method according to claim 14 comprising, in further combination, the step of:
   (d) after said step (c), passing through said well bore and into said formation an aqueous polymer solution.

19. A method according to claim 18 wherein:
said polymer is a partially hydrolyzed polyacrylamide and the concentration thereof in said solution is within the range of from 25 to about 50,000 ppm; and
the volume of said polymer solution passed into said formation is greater than 0.5 pore volume of said portion of said formation desired to be treated.

20. A method according to claim 19 wherein:
said oxidizing agent is an aqueous solution of hydrogen peroxide having a hydrogen peroxide concentration within the range of from 0.5 to about 30 weight percent; and
said reducing agent is an aqueous solution of formaldehyde having a formaldehyde concentration within the range of from 0.5 to about 10 weight percent.

* * * * *